(12) United States Patent
Brandley et al.

(10) Patent No.: US 12,176,560 B2
(45) Date of Patent: Dec. 24, 2024

(54) STRUCTURAL COMPOSITES FOR BATTERY ENCLOSURE

(71) Applicant: Bridgestone Americas, Inc., Nashville, TN (US)

(72) Inventors: Mark W. Brandley, Franklin, TN (US); Markus Freiberger, Munich (DE); Inigo E. Castro, Munich (DE); Sandra Dehn-Neef, Munich (DE); Adam Halsband, Birmingham, MI (US)

(73) Assignee: Bridgestone Americas, Inc., Nashville, TN (US)

( * ) Notice: Subject to any disclaimer, the term of this patent is extended or adjusted under 35 U.S.C. 154(b) by 456 days.

(21) Appl. No.: 17/753,078

(22) PCT Filed: Jul. 7, 2020

(86) PCT No.: PCT/US2020/040982
§ 371 (c)(1),
(2) Date: Feb. 17, 2022

(87) PCT Pub. No.: WO2021/034420
PCT Pub. Date: Feb. 25, 2021

(65) Prior Publication Data
US 2022/0294058 A1 Sep. 15, 2022

Related U.S. Application Data

(60) Provisional application No. 62/888,753, filed on Aug. 19, 2019.

(51) Int. Cl.
*H01M 50/00* (2021.01)
*H01M 10/613* (2014.01)
(Continued)

(52) U.S. Cl.
CPC ....... *H01M 50/229* (2021.01); *H01M 10/613* (2015.04); *H01M 10/625* (2015.04);
(Continued)

(58) Field of Classification Search
CPC ............. H01M 50/229; H01M 10/613; H01M 50/204; H01M 50/242; H01M 50/271; H01M 10/625
See application file for complete search history.

(56) References Cited

U.S. PATENT DOCUMENTS

| 10,308,290 B1 | 6/2019 | Dequine et al. |
| 2011/0206968 A1 * | 8/2011 | Nishimura .......... H01M 10/647 429/120 |

(Continued)

FOREIGN PATENT DOCUMENTS

| WO | WO-2016034544 A1 * | 3/2016 | ............. B60K 11/02 |
| WO | 2018202813 A2 | 11/2018 | |

OTHER PUBLICATIONS

Foerster et al., Cooling Plate, May 2016, See the Abstract. (Year: 2016).*

*Primary Examiner* — Anca Eoff
*Assistant Examiner* — Monique M Wills
(74) *Attorney, Agent, or Firm* — Shaun J. Fox; J. Gregory Chrisman

(57) ABSTRACT

A modular composite battery enclosure containing multiple individual composite structures attached together. The individual composite structures form covers that enclose an open area for housing a battery system of battery cells and cooling devices. The composite battery enclosures are lightweight and made of materials that can function to absorb energy and insulate the battery housing area. The composite structures contain a core material adhered and sandwiched between fiber layers.

20 Claims, 6 Drawing Sheets

(51) Int. Cl.
*H01M 10/625* (2014.01)
*H01M 50/204* (2021.01)
*H01M 50/229* (2021.01)
*H01M 50/242* (2021.01)
*H01M 50/271* (2021.01)

(52) U.S. Cl.
CPC ....... *H01M 50/204* (2021.01); *H01M 50/242* (2021.01); *H01M 50/271* (2021.01); *H01M 2220/20* (2013.01)

(56) References Cited

U.S. PATENT DOCUMENTS

| | | | |
|---|---|---|---|
| 2012/0103714 A1 | 5/2012 | Choi et al. | |
| 2015/0255764 A1 | 9/2015 | Kogyo et al. | |
| 2018/0337377 A1 | 11/2018 | Stephens et al. | |
| 2018/0345778 A1 | 12/2018 | Yamanaka | |
| 2019/0214615 A1* | 7/2019 | Hilmann | B60L 3/0007 |
| 2019/0237720 A1* | 8/2019 | Lucchesi | H01M 50/20 |

* cited by examiner

STRUCTURAL COMPOSITES FOR BATTERY ENCLOSURE

TECHNICAL FIELD

The present disclosure relates to modular structural composites for use as battery enclosures and, in particular, to reinforced structural composites for use as a battery enclosure for electric vehicles or equipment.

BACKGROUND

Recently, vehicles powered by electric batteries have grown in popularity with users. These vehicles allow a user the ability to charge the batteries at their place of residence or at a charging station and avoid the cost of purchasing gasoline. To supply the power needed to reach long distances, these vehicles need large capacity batteries. However, these large capacity batteries pose an increased risk to occupants and emergency responders if the batteries are damaged during a collision. The batteries need to be protected from the force generated during the collision or alternatively, any force transmitted to the batteries must be low enough so as not to cause significant damage to the batteries.

The present disclosure provides a battery enclosure that is strong and light weight, as compared to battery enclosures known heretofore. The enclosure is light weight so as not to add an appreciable amount of weight to the vehicle. Adding an appreciable amount of weight to the vehicle may negatively impact the performance of the vehicle. The enclosure is also strong to protect the batteries from significant damage during a collision.

SUMMARY

In a first aspect, disclosed is a composite battery enclosure that includes a molded top composite cover that has a monolithic panel having a first and second surface and made of fibers embedded in a first polymer, and a lateral beam connected to the monolithic panel, the lateral beam made of a first core bonded with a first fiber layer; and a molded bottom composite cover including a second core having a first surface, a portion of the first surface of the second core bonded to a second fiber layer embedded in a second polymer, and at least one outer cross member and at least one inner cross member, wherein the molded top composite cover is attached to the molded bottom composite cover.

In an example of aspect 1, the molded top composite cover has a pair of lateral beams, the pair of lateral beams separated by the monolithic panel and each lateral beam having the first core bonded with the first fiber layer.

In another example of aspect 1, the monolithic panel of the molded top composite cover includes a portion of the first core.

In another example of aspect 1, the first core of the at least one lateral bean is a honeycomb material.

In another example of aspect 1, a battery is positioned between the at least one outer cross member and the at least one inner cross member, the battery secured to the molded bottom composite cover.

In another example of aspect 1, a cooling device is in contact with a battery.

In another example of aspect 1, the cooling device is positioned below the battery and the cooling device is in contact with the molded bottom composite cover.

In another example of aspect 1, the molded bottom composite cover includes at least one recess for housing the cooling device.

In another example of aspect 1, the molded bottom composite cover includes a pair of outer cross members and more than one inner cross member positioned between the pair of outer cross members.

In another example of aspect 1, the at least one outer cross member and the at least one inner cross member are the same height and secured to the monolithic panel of the molded top composite cover.

In another example of aspect 1, the at least one outer cross member and the at least one inner cross member include a honeycomb material.

In another example of aspect 1, wherein a reinforcement plate is positioned adjacent the at least one inner cross member.

In another example of aspect 1, the reinforcement plate is metal and includes an opening for housing an attachment fixture for securing a battery to the molded bottom composite cover.

In another example of aspect 1, a seal is positioned between the molded top composite cover and the molded bottom composite cover, the molded top composite cover including a channel and the seal being arranged in the channel.

In another example of aspect 1, a portion of the second fiber layer of the molded bottom composite cover is adjacent the second core, the second fiber layer being located between a pair of outer cross members and in contact with the at least one lateral beam of the molded top composite cover.

In a second aspect, there is a composite battery enclosure including a molded top composite cover having a monolithic fiber panel, the monolithic panel with a first top fiber layer and a first bottom fiber layer, the first top fiber layer and the first bottom fiber layer made of fibers embedded in a first polymer, and a pair of lateral beams, the pair of lateral beams including a first core material, the first core material sandwiched between the first top fiber layer and the first bottom fiber layer; and a molded bottom composite cover including a second core sandwiched between a second top fiber layer and a second bottom fiber layer; the second top fiber layer and the second bottom fiber layer made of fibers embedded in a second polymer, and a pair of outer cross members and a plurality of inner cross members for defining battery retaining areas, wherein the molded upper composite cover is attached to the molded bottom composite cover.

In an example of aspect 2, the battery retaining areas include a recess for housing a cooling device.

In another example of aspect 2, the plurality of inner cross members include a third core material, the third core material in contact with the second core.

In another example of aspect 2, the plurality of inner cross members include a top surface, the top surface of the plurality of inner cross members being in contact with the monolithic fiber panel of the molded top composite cover.

In another example of aspect 2, a seal is positioned between the molded top composite cover and the molded bottom composite cover, the seal being outside the battery retaining areas defined by the pair of outer cross members and the plurality of inner cross members.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
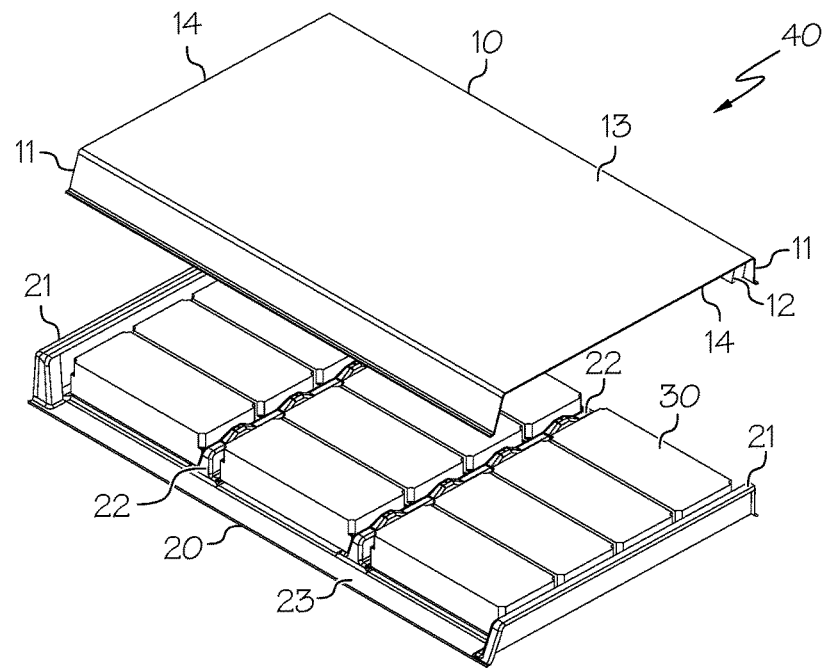
FIG. 1 shows a perspective view of an exploded two-piece battery enclosure including a molded upper composite cover and a molded bottom composite cover with battery retaining areas.

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably less than or not more than 25. In an example, such a range defines independently 5 or more, and separately and independently, 25 or less.

The terms "substantial," "substantially," and variations thereof as used herein are intended to note that a described feature is equal or approximately equal to a value or description. For example, a "substantially planar" surface is intended to denote a surface that is planar or approximately planar. It also is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The present disclosure relates to composite battery enclosures that can be used in a variety of applications. For example, the composite battery enclosures can be used to house battery systems and related accessories for mechanical equipment and in automotive applications (e.g., passenger vehicle, car, truck, bus, tractor, all-terrain vehicle). In some embodiments, the composite battery enclosure can house a battery system for electric and hybrid vehicles. The composite battery enclosure can be modular and contain multiple pieces connected or attached to one another to form a complete enclosure or box.

The composite battery enclosures can generally have increased global stiffness that resists bending and torsion of the structure and are relatively lightweight. In one or more embodiments, the composite battery enclosures can have energy-absorbing components to provide crash strength and integrity, for example, a crushable thermoplastic core sandwiched between fiber and polymer sheets. The composite structures can resist mechanical shock and impact from stone chips and ballistics. The energy-absorbing component is preferably strong enough to absorb energy and deflect it from being sent to a battery system or other structural components (e.g., cooling devices, wiring) in the enclosure. The composite battery enclosures can also have one or more components that effectively attenuate noise, vibration or a combination thereof, and provide desirable thermal conductivity and electromagnetic compatibility properties. The composite battery enclosures can have fire resistance properties, for instance, a fire-resistant shield or coating (e.g., ceramic, textiles with fire resistance) can be applied to the outer surface of the enclosures or used in an outer fiber layer that forms outer surfaces of the top or bottom composite cover. Other advantages of the composite battery enclosures can include being easily formable into a desirable shape by conventional molding methods that preferably use low or moderate pressure and heat, which advantageously lowers time and cost to manufacture the structures.

The individual composite structures can be attached to one another by conventional methods, for example, using an adhesive or epoxy, fastener (e.g., screw, bolt, clip) or welding. As formed, the composite structures can be attached or joined together to form a modular composite battery enclosure. Any suitable adhesive can be used, for example, an epoxy. The adhesive is applied to an outer surface of a composite cover, for example, an exposed surface of fiber layer such as an outer perimeter flange section. It is preferable that the composite covers are permanently attached to one another to ensure structural integrity of the modular composite structure during use. Other fasteners or attachment fixtures can be used in place of an adhesive, for example, a screw, snap fitting, rivet, clamp, bolt or clip. Local inserts or onserts can be provided at attachment locations to provide stiffness.

The individual composite structures, such as a molded bottom and top composite cover, can have similar components that can be made of the same or similar materials. For example, the composite covers can have a fiber-containing layer at least partially adhered to a core structure or material, which can optionally have select reinforced areas or regions thereon. The fiber layers and fiber reinforcement regions of various individual composite covers can be made of the same or similar materials to reduce material and manufacturing costs. Similarly, when recycled materials can be substituted, for example, for fibers in the fiber layers, such materials can be used to further reduce manufacturing costs and promote sustainability.

One or more embodiments further include methods for fabricating and manufacturing individual and modular composite battery enclosures. For example, a fiber layer can be positioned or applied on a surface or multiple surfaces of a core material (e.g., a first surface) to form a blank. A second fiber layer can be positioned on a second surface of the core material. Attachment devices can optionally be positioned below or on the fiber layers, for example, in cut out areas in the fiber layers. A curable material (e.g., resin) can be sprayed, poured, spread, rolled, brushed or calendared onto the fiber layers and reinforcement fibers to coat and embed the fibers in the curable material to form a pre-form composite. Under heated conditions, the pre-form composite can be molded (e.g., in a compression or press mold or similar tooling) to form the final shape of the composite battery enclosure.

Molding conditions such as temperature and pressure can be adjusted as needed but are preferably low to moderate to reduce time and cost of manufacturing the composite battery enclosure. For example, the enclosure can be heated during molding to a temperature in the range of about 100° to about 200° C., about 110° to about 190° C., about 120° to about 180° C., or about 130° to about 160° C. In another example, the enclosure can be subjected to pressure during molding in a range of about 0.1 megapascal (MPa) to about 1 MPa, about 0.15 to about 0.8 MPa, or about 0.2 to about 0.6 MPa.

The molding process can form areas of varying thickness in the composite battery enclosure that selectively reduce thickness of the core material, for instance, at a bend area or to form a recess, indentation, channel or groove. In the embodiments that include a honeycomb as the core material, sections of the honeycomb core can be crushed or partially crushed where thickness is reduced (e.g., at corners, edges, transition areas, recesses, channels, etc.). In one or more embodiments, it is desirable to utilize a thermoplastic material (e.g., polycarbonate) as the core material. For example, a thermoplastic core material can be melted under heated mold conditions and varying thickness can be achieved without changing the integrity of the material.

In one or more embodiments, the composite battery enclosure (e.g., molded covers joined together) can be trimmed and polished after being molded to remove any undesirable surface imperfections, for example, a burr or raised edge or piece of material left on the structure before coupling to another battery enclosure composite piece. Burrs or imperfections can be manually or mechanically removed, for instance, mechanically grinding or sanding the surface of the composite cover. Subsequent to a trimming step, if needed, the composite covers can be cleaned to remove debris or any excess material from the surface. Cleaning can be carried out with conventional methods, for example, pressurized gas or air can be blown on the composite covers to dislodge debris, such as dust or particles, that is adhered to the surface. The composite covers can also be brushed or wiped to remove unwanted material. In another example, the covers can be brought into contact with a cleaning solution, which can dissolve residue (e.g., release agents) from the surface of the cover. For instance, an aqueous solution with a cleaning agent (e.g., a surfactant) can be used. A cleaning solution can applied to the surface of the composite covers by any suitable method such as spraying, dipping or brushing.

The steps of trimming and cleaning prepare the composite battery enclosure for downstream processes if desired. In some embodiments, the composite battery enclosure can have additional coatings applied to its surface, such as an overcoat or protective coating (a fire, smoke and toxicity (FST) material, fire-retardant material or resin). In other embodiments, the composite battery enclosure can be painted for its final application, for example, installation in an electric or hybrid vehicle.

In one embodiment, the manufacturing methods can be carried out in a series of robotic work cells or manufacturing stations. In a first cell, a blank or biscuit is formed by sandwiching a core material (e.g., honeycomb or thermoplastic material) between two face sheets (fiber layers) and, optionally, an initial layer of thermoset resin is applied to the face sheets. The face sheets can contain fiber or be a fiberglass material. In an optional second cell, reinforcement material (e.g., reinforcement plate) or attachment devices/integral fasteners (e.g., insert, onsert, rivet, coupling) can be applied at one or more select areas onto the face sheets, for example, wetted face sheets. Reinforcement material can also include unidirectional glass, aramid, carbon fiber or a combination thereof. In a third cell, thermoset resin is applied to the reinforcement material sections, or alternatively, to the entire face sheets to embed the reinforcement material and/or face sheets in the resin material. The reinforced pre-form composite is molded in a low-pressure, heated press using a steel or aluminum tool. In a fourth cell, the composite battery enclosure or piece (cover) is trimmed to a final shape if needed and one or more fasteners are applied to edge areas for facilitating attachment to another composite cover to form a modular composite battery enclosure.

Assembly of the composite battery enclosure and related components can be carried out by positioning the bottom composite cover and then inserting the cooling devices or system. Battery cells can be mounted over the cooling system followed by connection of all electrical cables. A perimeter seal is positioned on the bottom composite cover before placing the top composite cover over the bottom cover. Attachment fixtures (e.g., screws) are used to secure the top and bottom composite covers together before mounting the assembled composite battery enclosure in the desired application such as an electric vehicle.

Figure 2:
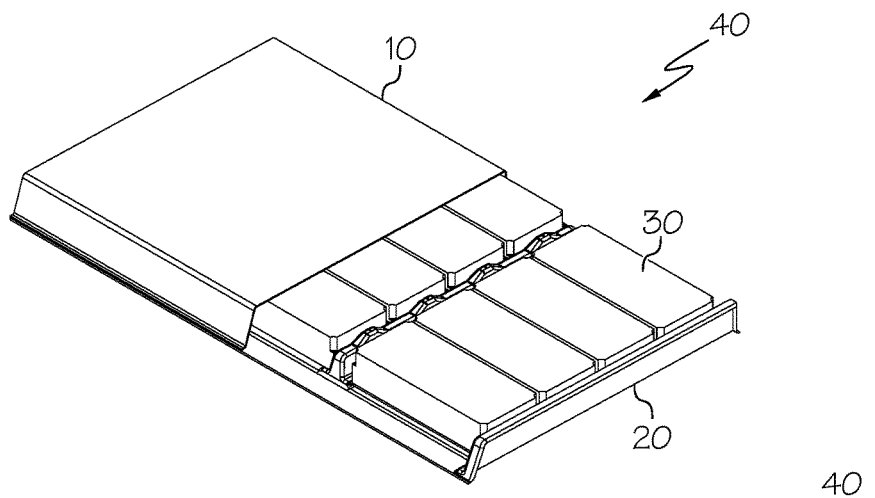
FIG. 2 shows a perspective view of the two-piece battery enclosure of FIG. 1 having the molded upper composite cover secured to the molded bottom composite cover such that the molded upper composite cover is partially removed to view batteries secured in retaining areas of the molded bottom composite cover.

Turning to the figures, FIGS. 1 and 2 show a two-piece composite battery enclosure 40 that includes a molded top composite cover 10 and a molded bottom composite cover 20, which can be attached to one another to provide a battery enclosure area. As shown, molded bottom composite cover 20 can be designed to house a battery system including a plurality of multiple batteries 30. Enclosure 40 can be a component of a vehicle such that enclosure 40 is secured to other portions or parts of a vehicle, for example, a frame structure. Top and bottom composite covers 10, 20 have core sections arranged between two fiber layers. The cores sections can extend in a central area of the covers along its entire length as shown or be positioned at select regions, for example, along a perimeter edge for providing impact protection.

In one or more embodiments, the cores of the individual composite covers can be a plurality of open or gas-filled cells defined by cell walls. The cells can have any suitable cross-section shape (e.g., circular, hexagon, square, etc.). For example, the core can be a honeycomb structure that includes many individual open cells side by side and arranged in the composite structures such that the cell walls are perpendicular to the longitudinal axis of the composite structure or an adjacent fiber layer. Alternatively, the cell walls can be arranged at other angles, for example, parallel or angled relative to the longitudinal axis of the composite structure. The cell walls can be made of plastic, for example, a thermoplastic or thermoset material. In one example, polypropylene or polycarbonate can be used as the material for the core and/or cell walls. The plurality of cells can be molded to form a desired shape wherein a portion of the cells are deformed under pressure, and optionally heat, to reduce the initial thickness of the core material.

In one or more embodiments, the core can be a non-cell material and composed any suitable thermoplastic material. Examples of thermoplastic materials include, but are not limited to, polypropylene and polycarbonate. The thermoplastic core can be a solid structure without openings such as cells. The thermoplastic core material can be molded under moderate heat and pressure to soften the material and form it into the desired shape having varying thickness. In one example, the thermoplastic material is heated above its glass transition temperature in a molding process to form the desired shape of the structure. The thermoplastic material can be heated, for example in a mold, to have a temperature in the range of about 100° to about 200° C., about 110° to about 190° C., about 120° to about 180° C., or about 130° to about 160° C. After forming the desired structure shape of the core, the thermoplastic material can be cooled to room temperature. In one or more embodiments, the average thickness of the core can be in the range of about 5 to about 250 millimeters (mm), about 5 to about 100 mm, or about 10 to about 50 mm.

Figure 3:
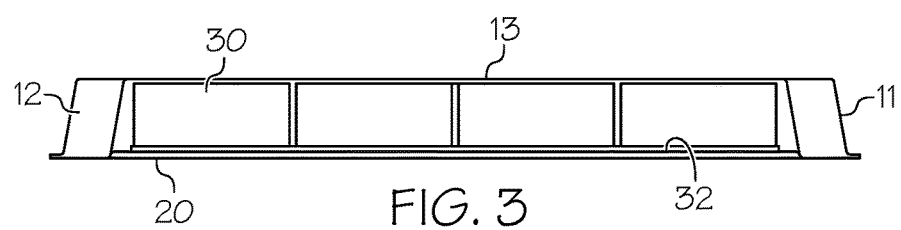
FIG. 3 shows a cross-section view of the two-piece battery enclosure of FIG. 1.

The core is preferably easily moldable to arrive at the desired shape for the composite covers. In one or more embodiments, the core can have regions of different thicknesses and angles along its length. As shown in FIG. 3, the molded top composite cover 10 has a pair of cores having substantially uniform thickness and in the shape of lateral beams 12 extending along substantially the entire length of the inner surface of the edges 11. The lateral beams 12 can be separate components that are attached (e.g., with adhesive) to the molded top composite cover. The lateral beams 12 can include a core material sandwiched between two fiber layers as similarly described herein. Alternatively, core material sections in the shape of rectangular beams can be arranged along opposite edges of the molded top composite cover 10 between fiber layers during manufacturing to form the lateral beams 12. The lateral beams 12 can have partially crushed core material sections near each end to form a smooth transition between a central monolithic panel region 13, having a thickness in the range of about 1 mm to about 10 mm, and a monolithic end cap or flange 14 (FIG. 1), which can have a thickness in the range of about 1 mm to about 8 mm. The lateral beams 12 can have a thickness in the range of about 40 mm to about 100 mm measured in the direction extending downward from the bottom face of panel 13.

The molded top composite cover 10 includes two opposite facing edges 11 that extend downward from a central monolithic panel 13 to form a U-shape with an extended flat middle section. The molded top composite cover 10 fits over and against the molded bottom composite cover 20. The central monolithic panel 13 of the cover 10 has a thin profile and provides a top cover region over a battery system in the enclosure 40. In one example, the monolithic panel 13 is formed as one or more fiber layers embedded in a polymeric material. The monolithic panel 13 positioned between both edges 11 running along the length of the panel 13 can be free of a core material to reduce overall thickness. In another example, the monolithic panel 13 can include a core material sandwiched between to fiber layers such that the core material is completely or substantially compressed or crushed to provide a reduced thickness over the entire panel 13.

The molded top composite cover 10 fits on the molded bottom composite cover 20 such that the ends of edges 11 rest on a monolithic fiber section or flange 23 of cover 20 and the monolithic end cap or flange 14 of the top composite cover 10 rest on the upper surface of a pair of outer cross members 21, and optionally the upper surface of inner cross members 22. The monolithic fiber section or flange 23 and the monolithic end cap or flange 14 can further include fiber reinforcement sections or patches to increase stiffness and rigidity for attaching the top and bottom composite covers 10, 20 together. At the contact sections of the covers 10, 20, fasteners, adhesives or attachment devices can be used to secure the covers 10, 20 together to form the composite battery enclosure 40. In an example, the covers 10, 20 can be attached to one another by a conventional method, such as glue, adhesive, tape, mechanical fasteners (e.g., rivets) and the like.

The molded bottom composite cover 20 has similar width and length dimension as cover 10. The molded bottom composite cover 20 is formed of a top and bottom fiber layer having a core material sandwiched there between. Thickness of the bottom composite cover 20 can range from about 10 to about 40 mm across the various components and regions in the cover 20 containing a core material. The bottom cover 20 is flanked on two opposite ends by outer cross members 21 that extend upward from a base section. The base section includes the portion of cover 20 below the outer and inner cross members 21, 22 and can have a thickness in the range of about 8 mm to about 20 mm. At the other two ends, the cover 20 has flat monolithic fiber section or flange 23 as a perimeter edge. The monolithic fiber sections or flanges 23 can have a thickness in the range of about 1 mm to about 5 mm when devoid of core material. Arranged between the two outer cross members 21, cover 20 contains multiple inner cross members 22 that extend upward from the base section, for example, at or about the same height of the outer cross members 21. The outer and inner cross members 21, 22, having a thickness in the range of about 10 mm to about 40 mm, provide bending stiffness and structural integrity to the bottom composite cover 20. The inner cross members 22 define battery retaining areas for positioning a battery system or array in the molded bottom composite cover. The outer and inner cross members 21, 22 contain central areas of core material. The core material of the base section can be the same core material in the members 21, 22. Alternatively, the members 21, 22 can be formed from additional core material arranged on the base section core material, for example, the additional core material can be the same as or different material from the base section.

The inner cross members 22 can be formed together with the rest of the bottom composite cover by molding a single core material or providing additional core material as noted above before applying overlying fiber layers and resin. Alternatively, the inner cross members 22 can be formed separately and applied or assembled to an outer surface of the bottom composite cover 20. The individual inner cross members 22 can include a core material wrapped in a fiber layer embedded in a polymeric material similar to or the same as the materials used in the bottom composite cover 20. The individual inner cross members 22 can be adhered to selective locations on the bottom composite cover 20 to partition battery retaining areas. Forming the inner cross members 22 separately allows for different possibilities regarding shape, design, material selection and manufacturing steps.

The core material can have properties that provide an energy absorbing and insulating abilities. For example, the core can be a low density, crushable core that deforms upon impact and yet retains mechanical integrity (e.g., stiffness) in normal operation. The open cells and cell walls of a honeycomb core can absorb impact energy as the cell walls collapse and break. Other materials that can absorb energy can include elastomers, thermoplastic material, foams (e.g., open cell, viscoelastic, etc.), paper (e.g., cardboard), or molded resins. These materials can be combined with the plurality of cells, for example, the cells or a portion thereof (e.g., select regions where impact or insulating is desired) can be filled or partially filled with foams or elastomers. In other embodiments, the core material can reduce conductivity as compared to other conventional materials such as steel. In one or more embodiments, the core materials of the composite structures of the present disclosure can include a conducting fiber (e.g., electrical conducting) for providing electromagnetic compatibility properties or behavior of the composite structure. For example, conductive reinforcements (e.g., metal inlay) or conductive wires can be layered in the sandwich composites or woven in fiber layers of the top and bottom composite covers 10, 20. In another example, shielding foil such as aluminum foil or an outer shielding layer such as metal (e.g., copper) veil can be applied to the battery enclosure 40.

As shown in FIGS. 1 and 2, the covers 10, 20 can include a core material sandwiched between and in direct contact with fiber layers. The fiber layers can contain continuous and/or discontinuous fibers embedded in a polymer material to form layers having a substantially uniform thickness. The fibers can be arranged together to form a sheet or mat that can be positioned on a core material.

The fibers can be entangled in a random pattern or in a more systematic design, for example, the fibers can be weaved together in the form of a woven fiber sheet. In other examples, the fibers can be loosely bundled together or pressed together into a mat to form a fiber sheet. A whole fiber sheet can be used to cover a core material surface (e.g., a top surface). Alternatively, strips or sections of fibers can be applied side by side in a segmented arrangement to cover a core material surface. Examples of fibers that can be used in the fiber layer include carbon fibers, glass fibers, plastic fibers, etc. In one example, an inexpensive fiberglass sheet can be applied to a first surface of a core material.

The fibers can be applied to the surface of a core material to cover an entire face surface of the core material or a portion thereof. In one or more embodiments, fibers can extend beyond the surface of a core material to form monolithic fiber sections (e.g., flanges) devoid of core material. Such sections can be combined with second fibers applied to an opposite face surface of the core material or a portion thereof.

Once the fibers are arranged on a core material, a polymer forming material or resin can be applied onto the fibers. The polymer forming material can penetrate and soak into the fibers arranged on the core material. As described herein, polymer forming material can be pushed and forced into the fiber layer to embed the fibers during a molding step, for example, a press or compression mold can push polymeric resin into the fibers to coat the fibers, fill voids in the fiber layer and contact the core material. A sufficient amount of polymer forming material can be applied to the fibers to form polymer layer that embeds the fibers and contacts the core material to adhere the fibers to one another and to the core. In one or more embodiments, the polymer can be formed from a curable polymer resin or composition. The composition can include a mixture of components, for example, a thermoset material, a thermoplastic material, a hardener, a catalyst, fillers, and any combination thereof. Materials can include epoxy, polyurethane, polyether ether ketone, polyethylene, or combinations thereof. The composition preferably has a low cure period in the range of 1 to 20 minutes, or less than 15, 10 or 5 minutes. The polymer forming material once cured can bond the fiber layer to the core material to form a laminate as the composite structure. The fiber layer preferably bonds or adheres to the core to prevent delamination or separation of the fiber layer from the core during use.

The fiber reinforcement regions, if present, can be made of carbon fibers, glass fibers, aramid fibers and the like or combinations thereof. The fibers can have any suitable length and can be supplied in bundles of unidirectional fibers. The length of the fibers can be substantially equal to one another or vary such that the lengths are random throughout the reinforcement region. The length of the fibers is preferably greater than 50 mm to impart increased stiffness to select areas of the composites. The reinforcement fibers can be arranged in a variety of ways, for example, in a unidirectional/aligned or woven (e.g., basket weave) pattern. Multiple layers of unidirectional fibers can be used, for example, each layer of unidirectional fibers can be arranged at a parallel, angled or perpendicular position relative to an underlying fiber reinforcement layer. Alternatively, the fibers can be discontinuous (e.g., fibers of different lengths) and appear as a random or non-uniform pattern.

As applied to a fiber layer or core material, a curable material can be applied onto the fiber reinforcement region or regions if present. The curable material can be the same curable material used to embed the fibers of the fiber layers. For instance, materials can include a mixture of components, for example, a thermoset material, a thermoplastic material, a hardener, a catalyst, fillers, and any combination thereof. Curable materials can include epoxy, polyurethane, polyether ether ketone, polyethylene, or combinations thereof. The curable material (e.g., resin) can be sprayed, poured, spread, rolled, brushed or calendared onto the fiber reinforcement region to embed or the fibers in the curable material to form a pre-form composite. Under heated conditions, the pre-form composite can be molded (e.g., in a compression) mold to form the final shape of the composite structure.

An attachment device, fastener or component thereof can be molded into or onto the composite battery enclosure to accommodate attachment or anchoring to another structure, such as the frame or body of a vehicle or adjacent composite cover in the case of a multi-piece composite battery enclosure. One or multiple attachment devices, fasteners or components thereof can be molded with the composite cover and any desirable location, for example, near or at an end region or near a cross member. As an insert, one or more attachment devices or components can be positioned between a core material and a fiber layer or skin and molded with the composite structure to provide an attachment area for securing a composite to another structure (another composite cover, battery or cooling device). In an example, a fastener component can positioned on the core material prior to applying fibers and resin to the surface of the core to arrange the fastener component as an composite structure insert. As an onsert, an attachment or fastener, or component thereof, can be positioned on the surface of a fiber layer or fiber reinforcement region overlying the core material such that the attachment device or component is formed on the outer surface of the composite structure. The use of an insert or onsert attachment component can reduce the need for adhesives for securing the composite covers to other parts.

FIG. 3 shows a side view of the top composite cover 10 secured to the bottom composite cover 20. Batteries 30 and a cooling device 32 (e.g., a flexible cooling system or cooling plate) are positioned on the bottom composite cover 20. The batteries 30 are spaced apart from one another and the overlying monolithic fiber panel 13 of the top composite cover. The batteries 30 and cooling device 32 are protected from impact from foreign objects by the lateral beams 12 of the top composite cover that contain a crushable core material for absorbing impact energy. The core material of the lateral beams 12 is positioned at the edges 11 of the top composite cover 10 and each core is sandwiched by fiber layers that join at each end of the lateral beams 12. At one end, the fiber layers join to form the monolithic fiber panel 13 at the central area of the cover 10 and, at the other end, the fiber layers join to form a flat monolithic fiber section that constitutes the perimeter edge of two ends of the cover 10. The flat monolithic fiber section (e.g., flange) rests against an opposing monolithic fiber section at the perimeter edge of the bottom composite cover 20 for joining the two covers 10, 20 together. The polymeric material and fibers of the fiber layers can be the same and is preferable for joining the layers together at the ends of a core material, for example, for forming the monolithic fiber ends of the covers 10, 20.

Figure 4:
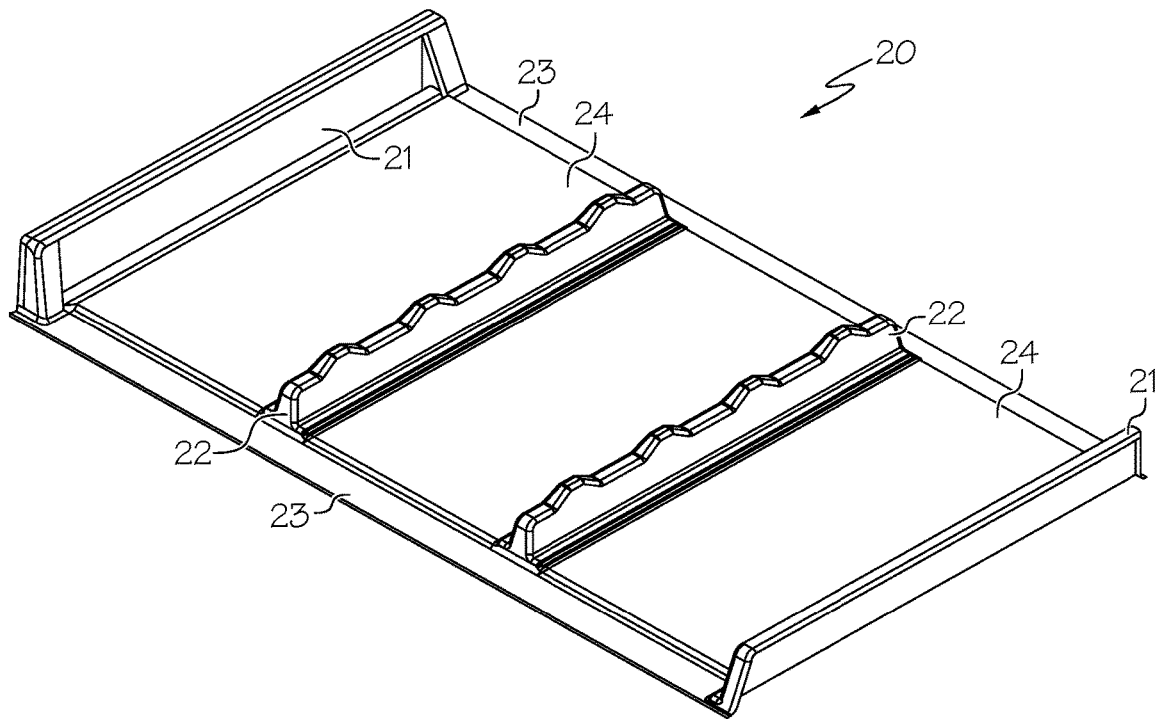
FIG. 4 shows a perspective view of a molded bottom composite cover of a battery enclosure structure having outer cross members and multiple inner cross members.

FIG. 4 illustrates the bottom composite cover 20 having two outer cross members 21 that form two ends of the cover 20. That is, the outer cross members 21 form the entire length of two ends of the cover 20. For attaching to the top composite cover 10, the top surfaces of the outer cross members 21 contact the monolithic end caps 14 at each end of the top cover 10. The outer cross members 21 are formed by core material sandwiched between two fiber layers that extend upward from and adjacent to a battery retaining area 24. At the top surface of the outer cross members 21 a flat monolithic fiber section can extend outward away from the battery retaining area 24 to form a lip that encloses a top edge of the core material. At the bottom of the outer cross member 21, the thickness of the core material can be reduced to form a base section the includes multiple battery retaining area 24. At opposing ends of the battery retaining areas 24, for instance adjacent the outer cross member 21, monolithic fiber sections 23 are formed by fiber layers joining together to encase core material. Adjacent the monolithic fiber sections 23, the remaining two ends of the battery retaining area 24 are formed by a combination of an outer cross member 21 and inner cross member 22 or two inner cross members 22.

Figure 5:
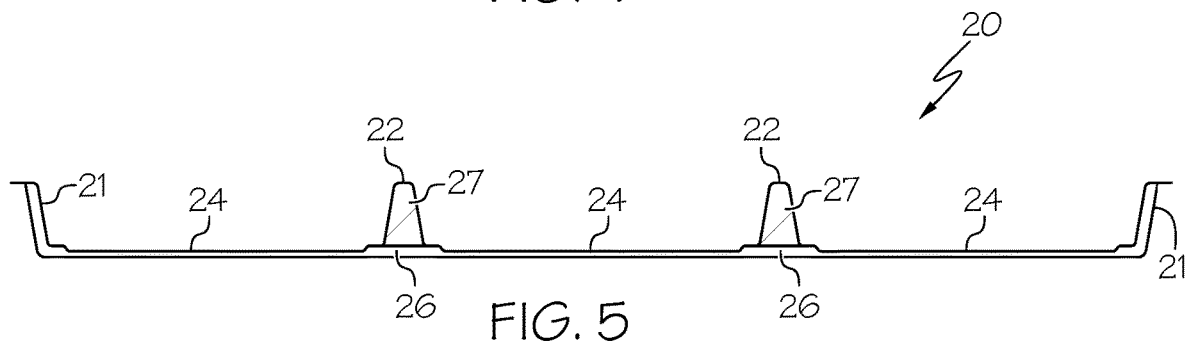
FIG. 5 shows a cross-section view of a molded bottom composite cover of a battery enclosure structure having outer cross members and multiple inner cross members.

Inner cross members 22 of the bottom composite cover 20 are formed by core material covered by a top fiber layer that extends to adjacent battery retaining areas 24. The core material of the inner cross members 22 can be the core material of the base section of the cover 20 or additional core material 27 that is positioned on top of the underlying base section core material 26 as shown in FIG. 5. As shown, the inner cross members 22 extend above the base section and battery retaining areas 24 to form one wall of the battery retaining area 24, wherein other defining walls are formed by an outer cross member 21 or inner cross member 22 and edges 11 or lateral beams 12 of the top composite cover 10. The battery retaining areas 24 can be indented or sunken portions of the base section and positioned between cross members 21, 22 and monolithic fiber sections 23. The battery retaining areas 24 have a reduced thickness, which can be achieved by partially crushing core material during the molding process.

Figure 6:
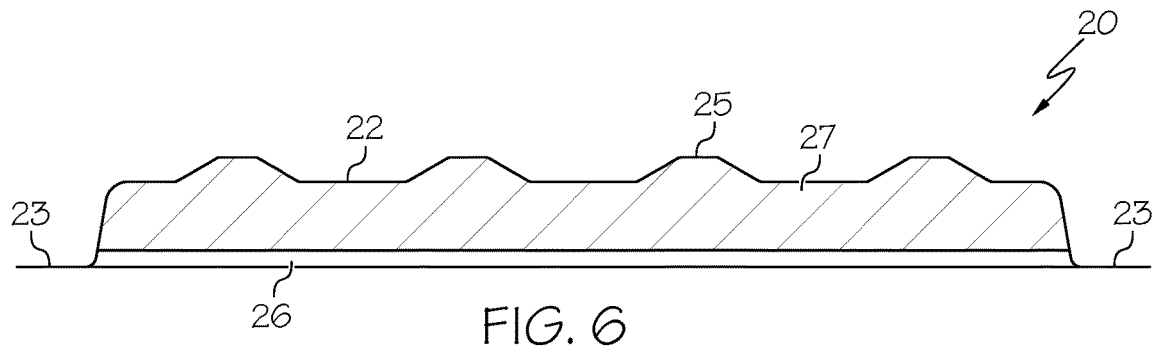
FIG. 6 shows a cross-section view of a molded bottom composite cover of a battery enclosure structure having an inner cross member and monolithic fiber section arranged along both ends of the inner cross member.

The bottom composite cover 20 can include one or multiple inner cross members 22, for example, 2, 3, 4, 5 or 6 inner cross members 22. The inner cross members 22 can extend upward to have the same top surface height as the pair of outer cross members 21. For example, the inner cross members 22 can have peak height areas at the same plane of the top surface of the outer cross members 21 to providing attachment areas for securing the top composite cover 10 to the bottom composite cover 20. As shown in FIG. 5, the top surface of the inner cross members 22 is the same as that of the outer cross members 21. FIGS. 4 and 6 show that the inner cross members 22 can include multiple raised sections having a peak top surface 25 that can be the same height of the top surface of the outer cross members 21. The raised sections of the inner cross members 22 can provide attachment faces that contact the monolithic panel 13 of the top composite cover 10.

Figure 7:
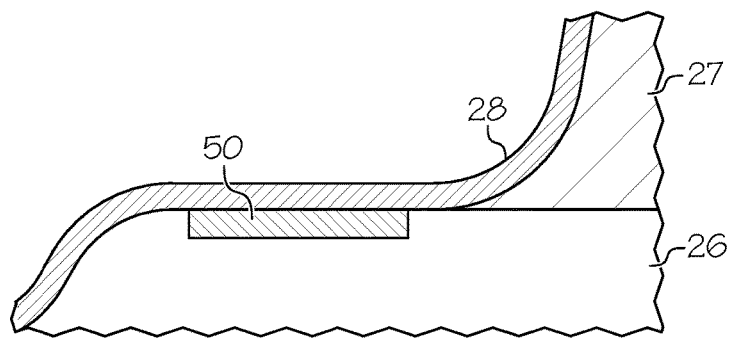
FIG. 7 shows cross-section view of a side portion of an inner cross member of a molded bottom composite cover, the side portion includes a reinforcement plate.

Adjacent each side of the bottom section of the inner cross members 22, and also adjacent the battery retaining area 24, a reinforcement plate can be used to provide an attachment support for a battery unit connection to the cover. A reinforcement plate can have a thickness in the range of about 1 mm to about 5 mm. As shown in FIG. 7, a reinforcement plate 50 can be positioned between the fiber layer 28 and the base section core material 26 adjacent the base of the inner cross member 22. The reinforcement plate 50 can be made of any suitable material, for example, metal, plastic or a reinforcing fiber section. The reinforcement plate 50 can include an opening for accepting an attachment fixture (e.g., screw, bolt, rod) for securing a component to the bottom composite cover 20. For example, the reinforcing plate 50 can be used to provide an attachment location for securing a battery 30 or cooling device 32 in the battery retaining area 24. An example reinforcement plate 50 can include a rivet nut for accepting a screw or bolt for attachment of a battery unit. An opening for accepting an attachment fixture in the reinforcement plate 50, and overlying and underlying materials (e.g., fiber layer, core material) if applicable, can be made by drilling a pilot hole. Multiple reinforcement plates 50 can be positioned on each bottom side of the inner cross members 22 along the length of the member such that multiple components can be secured to the bottom composite cover 20. For instance, 2, 3, 4, 5 or 6 reinforcement plates 50 can be arranged along each bottom edge of an inner cross member 22. Multiple reinforcement plates 50 are preferably spaced apart from one another (e.g., at equal distances).

Figure 8:
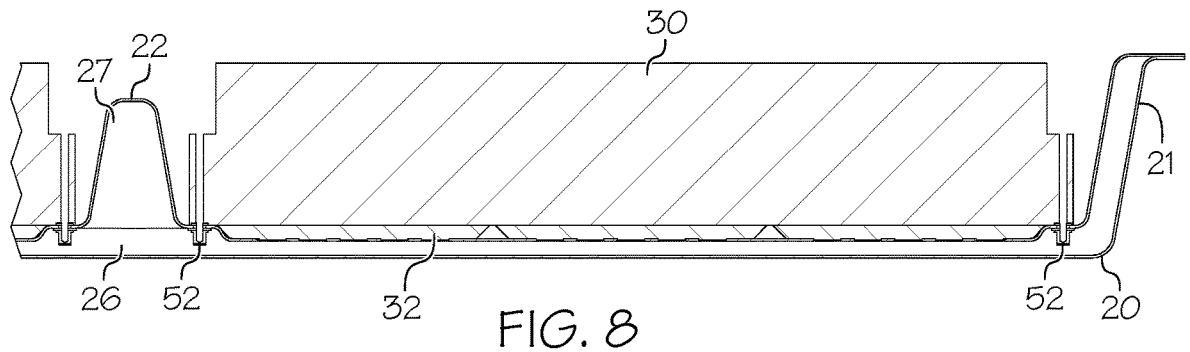
FIG. 8 shows a cross-section view of a molded bottom composite cover having a battery and cooling device positioned in a battery retaining area between an inner cross member and an outer cross member. The battery is secured to the molded bottom composite cover at ends adjacent a recess housing the cooling device.
Figure 10:
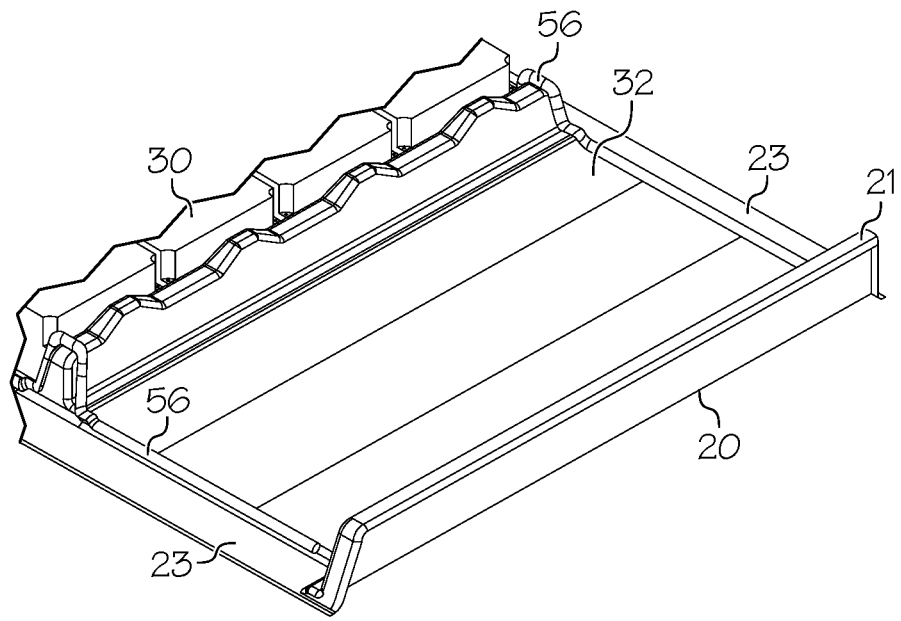
FIG. 10 shows a perspective view of a molded bottom composite cover having a cooling device positioned in a recess between and inner cross member and an outer cross member. The molded bottom composite cover further includes channels for mounting other equipment associated with the batteries or cooling devices for operation in the composite battery enclosure.

FIG. 8 shows a battery 30 secured to a bottom composite cover 20 by use of attachment fixtures that are secured to reinforcement plates 52 positioned adjacent bottom sections of an inner cross member 22 and an outer cross member 21. The reinforcement plates 52 provide a stiff, rigid plate area for an attachment fixture to ensure stability of the battery position in the battery enclosure 40. The reinforcement plate 52 can extend into the underlying core material, for example, can be housing for a bolt or screw that is used to secure a battery 30 to the bottom composite cover 20. As shown, the bottom composite cover 20 contains a battery retaining area 24 having a basin of reduced thickness with a perimeter that raises upward and is surrounded by cross members 21, 22 and two monolithic fiber sections 23 (FIG. 10). A cooling device 32 is arranged directly below the battery 30 in the battery retaining area 24. Securing the battery 30 to the bottom composite cover 20, for example at the reinforcement plates 52, the cooling device 32 is secured in place and pressed against the bottom surface of the battery 30 and the bottom of the battery retaining area 24 (i.e. the top surface of a fiber layer). The cooling device 32 serves to ensure a constant operating temperature at the battery surface and in the composite battery enclosure 40. One or more cooling devices 32 can be arranged in the battery retaining area 24 as desired. Alternative positioning of the cooling devices 32 can include being located on top of the battery 30. Rising heat generated from the battery 30 will be effectively absorbed with a cooling device 32 affixed on top of the battery 30.

Figure 9:
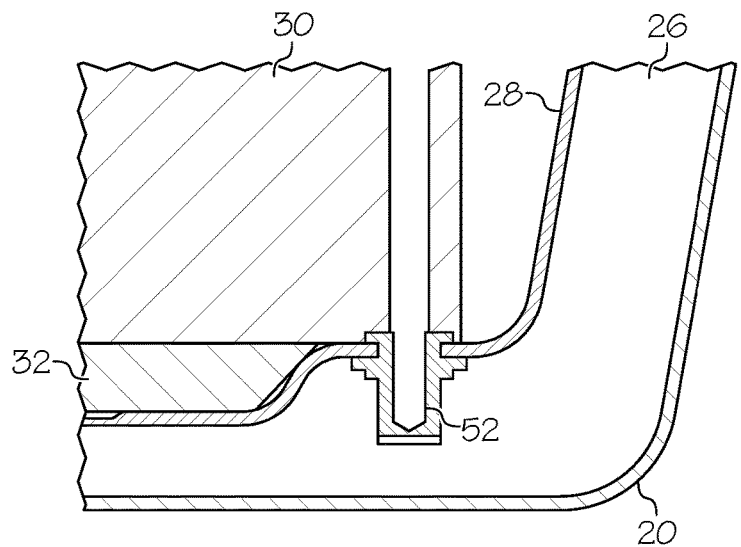
FIG. 9 shows a cross-section view of a corner of a molded bottom composite cover having a battery secured to the cover with an attachment fixture that extends through a fiber layer and into a core material of the cover.

FIG. 9 shows the cooling device 32 of FIG. 8 secured below and in contact with the bottom surface of battery 30. Battery 30 is secured to the bottom composite cover 20 by means of an attachment fixture that fits in reinforcement plate 52 that provides a housing that extends into base section core material 26 at the bottom edge of the outer cross member 21 (FIG. 8). The reinforcement plate 52 is positioned as an onsert in fiber layer 28 such that reinforcement plate 52 is in direct contact with battery 30. The cooling device 32 rests below the battery 30 that extends past the cooling device 32 and onto the mounting sections that house the reinforcement plates 52 adjacent each bottom area of the cross members 21, 22. FIG. 10 shows multiple cooling devices 32 arranged in series in the battery retaining area 24 of the bottom composite cover 20.

Figure 12:
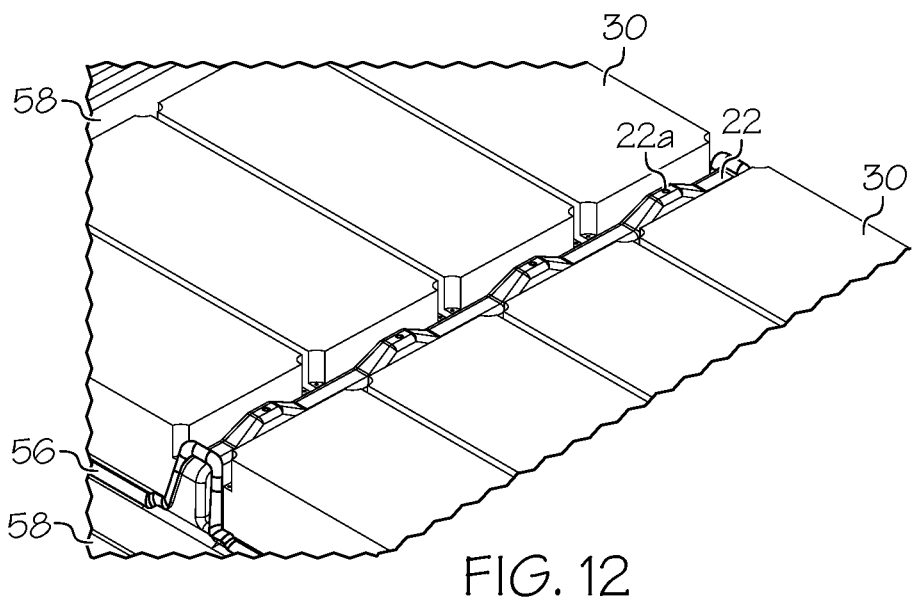
FIG. 12 shows a perspective view of a molded bottom composite cover having o-ring seals on raised portions of an inner cross member for sealing with a molded top composite cover. Outer perimeter portions of molded bottom composite cover also include a seal material for contact with a molded top composite cover.

At one or more ends of the series of cooling devices 32, cooling conduits can be positioned on the bottom composite cover 20 to provide an inlet and outlet for circulating cooling fluid to the cooling devices 32. Channels or grooves can be molded into the bottom composite cover 20 for positioning the cooling conduits. For example, the raised section between the battery retaining area 24 bottom and the monolithic fiber section or flange 23 at the perimeter edge of cover 20 can include a channel for housing one or more cooling conduits. The cross members (e.g., inner cross member 22) can be molded with one or more channels for mounting cooling conduits (e.g., cooling conduit 56 as shown in FIG. 12) that travel from one cooling device 32 in a battery retaining area 24 to another cooling device 32 in a second battery retaining area 24. The cross members (e.g., inner cross member 22) can also be embossed or molded for positioning of electrical conduits or cables for connection to batteries 30. In one example, the cross members can include passages for through ways for passing conduits through the cross members. An opening can be formed in the bottom composite cover 20 for accommodating multiple cooling conduits and electrical conduits that are connected to the batteries 30 and cooling devices 32 housed in the enclosure 40. An opening is preferably sealed to reduce any exposure of ambient conditions outside of the enclosure 40 to the internal cavity that houses the batteries 30 and cooling devices 32 in the interior of the enclosure 40. Conventional seals can be used as desired and the covers 10, 20 can be molded to accommodate seals as needed, for example, molding a channel or lip at the outside opening in a cover for cooling and/or electrical conduits.

Figure 11:
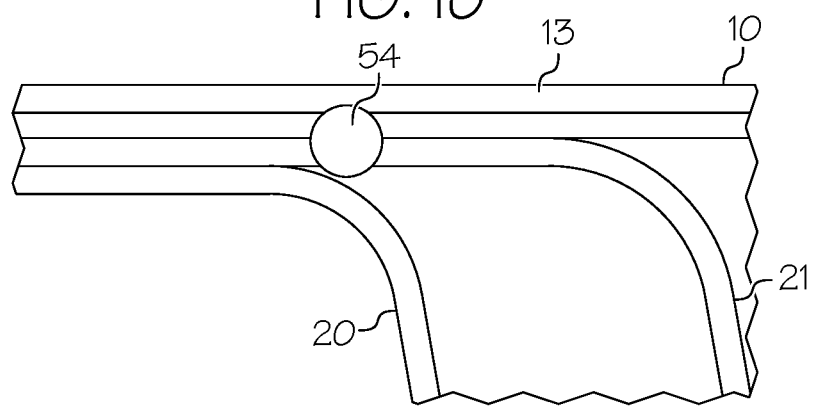
FIG. 11 shows a cross-section view of the bottom surface of a molded top composite cover sealed with the top surface of a molded bottom composite cover by means of a seal material.

The top and bottom composite covers 10, 20 are also preferably sealed in addition to being secured together by attachment fixtures. FIG. 11 shows a seal 54 positioned between a top surface of an outer cross member 21 of the bottom composite cover and a bottom surface of a monolithic panel 13 of the top composite cover 10. The seal 54, for example an elastomer seal, can be in the form of a ring that extends around the perimeter edge of where the top and bottom composite covers 10, 20 meet, for example at the flange areas formed by monolithic fiber sections (e.g., 23, 14, 11a, 21). As positioned between surfaces of the top and bottom composite covers 10, 20, the seal 54 can be squeezed or compressed between the covers 10, 20 to seal the battery retaining area 24 from outside environment conditions, for example, humidity, dust, debris, temperature variations, etc. Preferably the seal 54 is exposed to sufficient pressure between the covers 10, 20 to reduce or eliminate movement during operation. In one or more embodiments, a channel can be molded into a surface of the top composite cover 10, the bottom composite cover 20, or a combination thereof, to house a portion of the seal 54 to ensure that is does not move or become displaced during operation of the composite battery enclosure 40. The seal 54 can be a round shaped material to be compressed or a flat seal, for example, a flat seal with integrated holes to accommodate attachment points between the top and bottom composite covers 10, 20. The integrated holes in the seal can be used to ensure proper location of the seal once aligned with the cover connection points.

Figure 17:
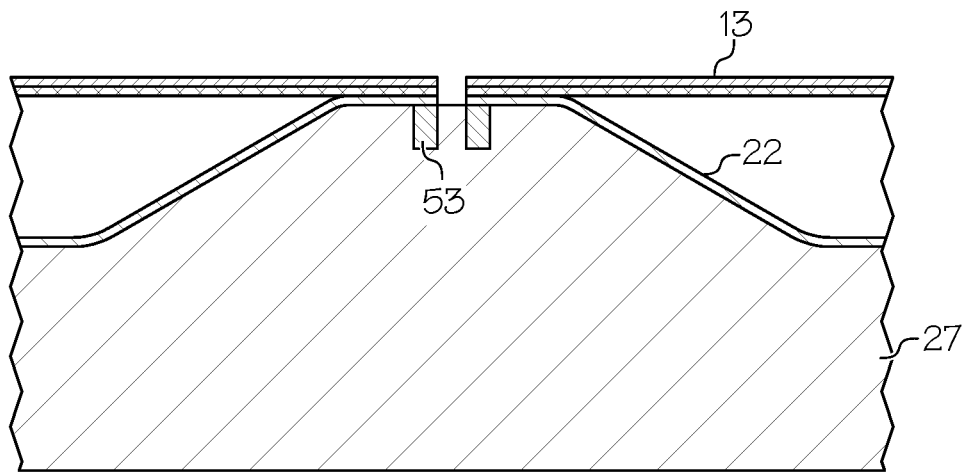
FIG. 17 shows a partial cross-section view of an inner cross member of a molded bottom composite cover having a raised portion secured to a portion of a monolithic fiber panel of a molded top composite cover.

FIG. 12 shows an outer perimeter seal 58 that is arranged on the top surface of outer cross member 21 and the monolithic fiber section 23 of the bottom composite cover 20. The outer perimeter seal 58 surrounds the battery retaining areas 24 and installed batteries 30 and cooling devices 32 positioned in the composite battery enclosure 40. As further shown, inner cross member 22 has multiple raised sections having a peak top surface that includes a seal 22a for contacting a bottom surface of the monolithic panel 13 of the top composite cover 10. Seal 22a can be of any desired shape, for example, an o-ring. The raised sections of the inner cross member 22 can include reinforcement or mounting plates for accommodating attachment fixtures that can be used to secure the top composite cover 10 to the bottom cover 20. FIG. 17 shows an attachment area between the top surface of an inner cross member 22 and the bottom surface of a monolithic fiber panel 13 of the top composite cover 10. The monolithic fiber panel 13 has an opening in register with an attachment insert 53 in an opening in the fiber layer of the inner cross member 22. An attachment fixture can be inserted through the opening in the panel 13 and into the attachment insert 53 to secure the two covers 10, 20 together.

Figure 13:
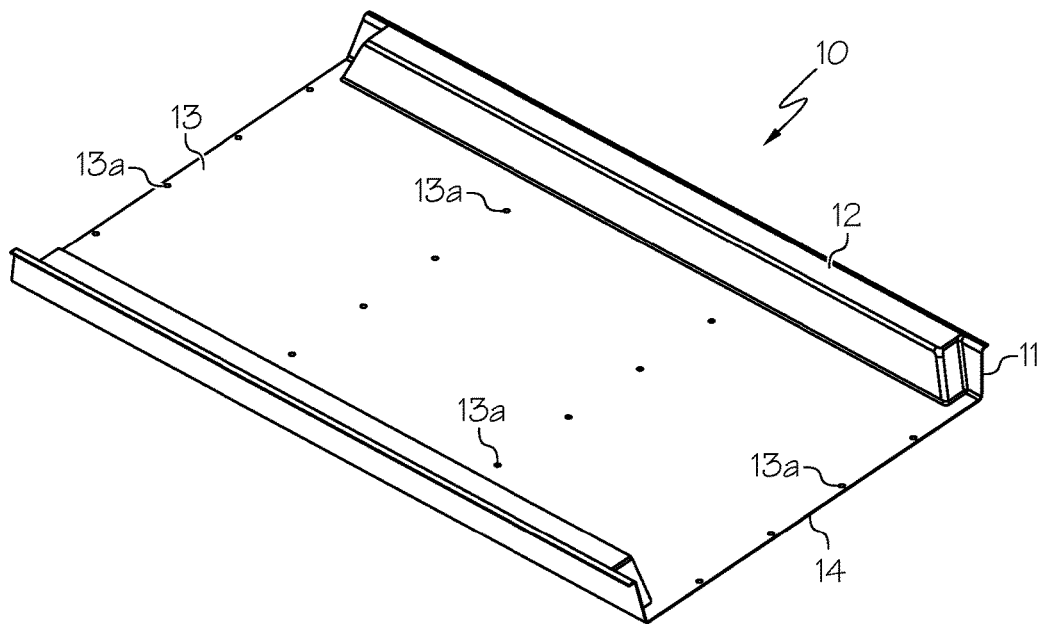
FIG. 13 shows the bottom surface side of a molded top composite cover having a monolithic fiber panel section with two lateral beams of core material positioned along the interior edge of each side of the molded top composite cover. The monolithic fiber panel includes tap openings for securing the molded top composite cover to portions of a molded bottom composite cover.

FIG. 13 shows a bottom surface view of the top composite cover 10 with the monolithic panel 13 having multiple openings 13a for attaching cover 10 with the bottom composite cover 20. As shown, multiple arrays of openings 13a are provided that are arranged to line up and be in register with attachment areas on inner cross members 22 of the bottom composite cover 20. For example, the arrays of openings 13a can align with openings along the top surface of inner cross members 22 (e.g., peak top surface area of raised sections on the inner cross members 22). The monolithic end cap 14 of cover 10 can include openings 13a for attaching to the outer cross members 21 of a bottom cover 20. The openings 13a in the cover 10 can be locally reinforced with fiber reinforcement inserts or patches at the openings prior to forming the openings, for example, by a drilling or punching operation.

Figure 14:
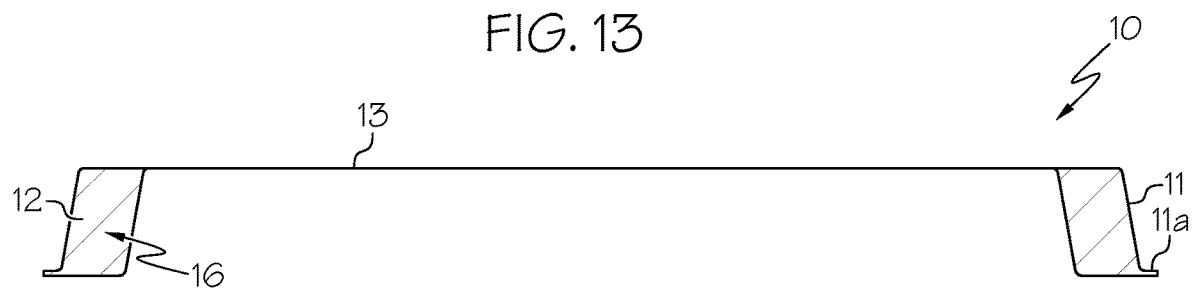
FIG. 14 shows a cross-section view of a molded top composite cover having a central monolithic fiber panel section with two lateral beams of core material on both ends.
Figure 15:
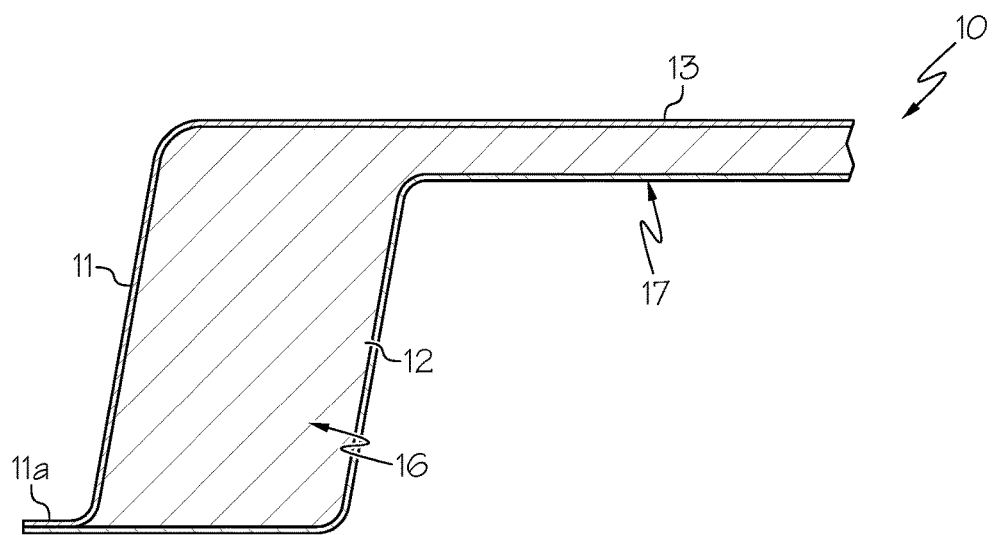
FIG. 15 shows a partial cross-section view of a molded top composite cover having a central sandwich-type composite section connected with a lateral beam section having an increased thickness of core material of the sandwich-type composite.
Figure 16:
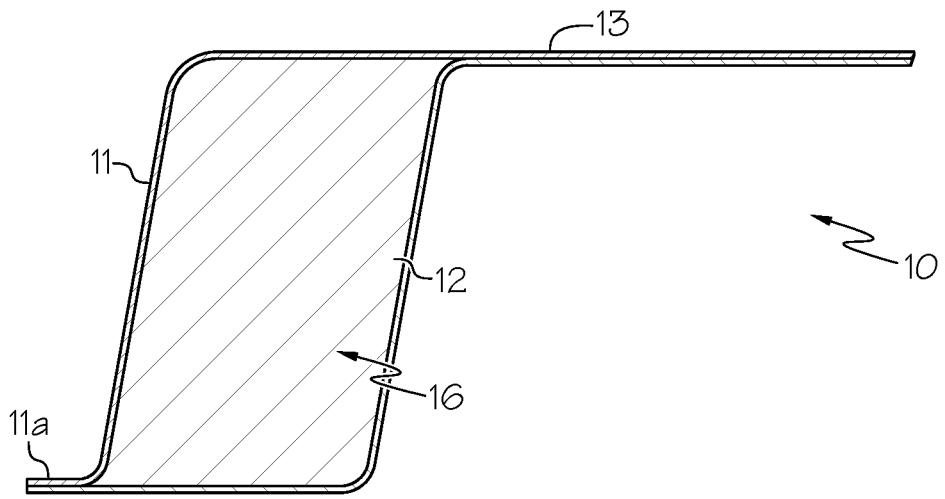
FIG. 16 shows a partial cross-section view of a molded top composite cover having a monolithic fiber panel transitioning into a lateral beam having a core material with a monolithic fiber section at an end.

FIGS. 14 through 16 show multiple embodiments of a top composite cover 10. Top composite covers 10 of FIGS. 14 and 16 have a monolithic fiber panel 13 composed of two fiber layers bonded together with polymer material. The fiber layers separate at each edge 11 to accommodate a core material 16 that forms a lateral beam 12 that extends downward from an edge of the panel 13. The outer edge of the cover 10 includes a fiber monolithic section or flange 11a that is composed of the fiber layers encapsulating the core material 16 of the lateral beam 12 joining together and being bonded together with a polymer material.

Alternatively, as shown in FIG. 15, the core material 16 runs through the entire section of the top composite cover 10 and is capped at each end with the fiber layers being bonded to together. The core material 16 is partially crushed to reduce thickness relative to the lateral beams 12 to reduce the profile of panel 13 as a composite panel rather than a monolithic fiber panel. Preferably, the core material 16 of the lateral beams 12 is the same material that forms the core of panel 13. The use of core material 16 in panel 13 provides increased bending stiffness as compared to a monolithic fiber panel, however, cavity space in the composite battery enclosure 40 is reduce as the profile of the panel 13 with core material 16 is greater than a monolithic fiber panel.

The top composite covers 10 of FIGS. 14 through 16 can further include the incorporation of longitudinal or cross beam 17 that extend downward from the bottom surface of panel 13 and into the battery retaining area 24 of the composite battery enclosure 40. The beams 17 can be formed similar to the inner cross members 22 of the bottom composite cover 20. Core material 16 can be inserted between fiber layers of the monolithic fiber panel during assembly and molded in place at a desired shape to form beams. Alternatively, the beams 17 can be formed separately from the cover 10 and subsequently attached to the bottom surface of panel 13 in the desired locations. Use of the beams 17 can provide increased bending stiffness to the panel 13 and potential local impact resistance due to the use of a crushable core material. The beams 17 add to the overall thickness of the panel 13 and thus reduce the available space in the battery retaining area 24 of the composite battery enclosure 40.

Figure 18:
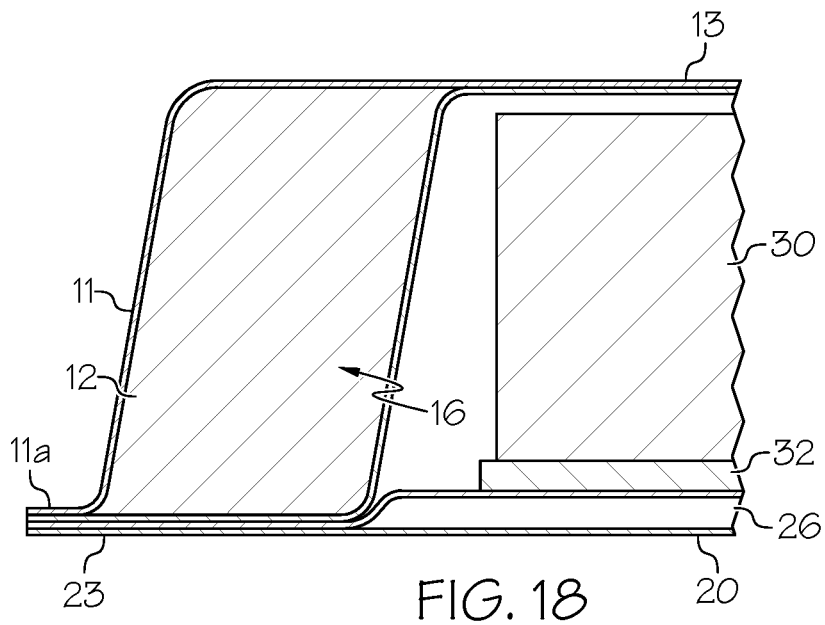
FIG. 18 shows a partial cross-section view of an edge of a molded top composite cover secured to an edge of a molded bottom composite cover and a battery on top of a cooling device resting on a base section of the molded bottom composite cover.

FIG. 18 shows a fiber monolithic section or flange 11a of an edge 11 of a top composite cover 10 secured to a monolithic fiber section or flange 23 of a bottom composite cover 20. Any desirable attachment fixture can be used to secure the two sections together. For example, the sections 11a, 23 can be provided with an attachment insert or onsert that provides an opening for a screw, bolt, or rivet to secure the edges of the covers 10, 20 together. In another example, a bushing can be used to prevent clamping of the fiber layup. In yet another example, reinforcement plates can be used on the top and bottom sides of the monolithic fiber sections or flanges 11a, 23 to provide structural support.

In one or more embodiments, the attachment point can be away from the fiber flange area and located below the lateral beam 12 of the top composite cover 10. An attachment fixture can be inserted through the monolithic fiber sections or flanges 11a, 23 of the covers 10, 20 and into the core material 16 of the lateral beam 12. An insert can be used at the bottom surface of the lateral beam 12 for accommodating an attachment fixture. Positioning the connection point inward to below the lateral beam 12 can increase stiffness of the composite battery enclosure.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A composite battery enclosure comprising:
   a. a molded top composite cover comprising
      i. a monolithic panel comprising fibers embedded in a first polymer, the monolithic panel comprising a first surface and a second surface; and
      ii. at least one lateral beam connected with the monolithic panel, the at least one lateral beam comprising a first core bonded with a first fiber layer;

and b. a molded bottom composite cover comprising
  i. a second core comprising a first surface, a portion of the first surface of the second core bonded to a second fiber layer embedded in a second polymer; and
  ii. at least one outer cross member and at least one inner cross member, wherein the monolithic panel of the molded top composite cover is attached to an upper surface of the at least one outer cross member of the molded bottom composite cover.

2. The composite battery enclosure of claim 1, wherein the molded top composite cover comprises a pair of lateral beams, the pair of lateral beams separated by the monolithic panel and each lateral beam comprising the first core bonded with the first fiber layer, the monolithic panel being free of the first core.

3. The composite battery enclosure of claim 1, wherein the monolithic panel of the molded top composite cover comprises a portion of the first core.

4. The composite battery enclosure of claim 1, wherein the first core of the at least one lateral beam is a honeycomb material.

5. The composite battery enclosure of claim 1, wherein a battery is positioned between the at least one outer cross member and the at least one inner cross member, the battery secured to the molded bottom composite cover.

6. The composite battery enclosure of claim 5, wherein a cooling device is in contact with the battery.

7. The composite battery enclosure of claim 6, wherein the cooling device is positioned below the battery and the cooling device is in contact with the molded bottom composite cover.

8. The composite battery enclosure of claim 6, wherein the molded bottom composite cover comprises at least one recess for housing the cooling device.

9. The composite battery enclosure of claim 1, wherein the molded bottom composite cover comprises a pair of outer cross members and more than one inner cross member positioned between the pair of outer cross members.

10. The composite battery enclosure of claim 1, wherein the at least one outer cross member and the at least one inner cross member are the same height and secured to the monolithic panel of the molded upper composite cover.

11. The composite battery enclosure of claim 1, wherein the at least one outer cross member and the at least one inner cross member comprise a honeycomb material.

12. The composite battery enclosure of claim 1, wherein a reinforcement plate is positioned adjacent the at least one inner cross member.

13. The composite battery enclosure of claim 12, wherein the reinforcement plate is metal and comprises an opening for housing an attachment fixture for securing a battery to the molded bottom composite cover.

14. The composite battery enclosure of claim 1, wherein a seal is positioned between the molded top composite cover and the molded bottom composite cover, the molded top composite cover comprising a channel and the seal being arranged in the channel.

15. The composite battery enclosure of claim 1, wherein a portion of the second fiber layer of the molded bottom composite cover is adjacent the second core, the second fiber layer being located between a pair of outer cross members and in contact with the at least one lateral beam of the molded top composite cover.

16. A composite battery enclosure comprising:
  a. a molded top composite cover comprising
    i. a monolithic fiber panel, the monolithic panel comprising a first top fiber layer and a first bottom fiber layer, the first top fiber layer and the first bottom fiber layer comprising fibers embedded in a first polymer, the monolithic fiber panel being free of a core material; and
    ii. a pair of lateral beams, the pair of lateral beams comprising a first core material, the first core material sandwiched between the first top fiber layer and the first bottom fiber layer; and
  b. a molded bottom composite cover comprising
    i. a second core sandwiched between a second top fiber layer and a second bottom fiber layer;
    the second top fiber layer and the second bottom fiber layer comprising fibers embedded in a second polymer; and
    ii. a pair of outer cross members and a plurality of inner cross members for defining battery retaining areas, wherein the molded top composite cover is attached to the molded bottom composite cover.

17. The composite battery enclosure of claim 16, wherein the battery retaining areas comprise a recess for housing a cooling device.

18. The composite battery enclosure of claim 16, wherein the plurality of inner cross members comprise a third core material, the third core material in contact with the second core.

19. The composite battery enclosure of claim 16, wherein the plurality of inner cross members comprise a top surface, the top surface of the plurality of inner cross members being in contact with the monolithic fiber panel of the molded top composite cover.

20. The composite battery enclosure of claim 16, wherein a seal is positioned between the molded top composite cover and the molded bottom composite cover, the seal being outside the battery retaining areas defined by the pair of outer cross members and the plurality of inner cross members.

* * * * *